(12) United States Patent
Luo

(10) Patent No.: US 11,620,251 B2
(45) Date of Patent: Apr. 4, 2023

(54) PARTITIONED UFP FOR DISPLAYPORT REPEATER

(71) Applicant: Cadence Design Systems, Inc., San Jose, CA (US)

(72) Inventor: Yao Luo, Sunnyvale, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 17/303,230

(22) Filed: May 24, 2021

(65) Prior Publication Data

US 2022/0374386 A1    Nov. 24, 2022

(51) Int. Cl.
*G06F 13/20* (2006.01)
*G06F 13/42* (2006.01)
*G09G 5/00* (2006.01)
*G06F 13/40* (2006.01)

(52) U.S. Cl.
CPC ........ *G06F 13/4282* (2013.01); *G06F 13/409* (2013.01); *G06F 13/4081* (2013.01); *G09G 5/006* (2013.01)

(58) Field of Classification Search
None
See application file for complete search history.

(56) References Cited

U.S. PATENT DOCUMENTS

| | | | | |
|---|---|---|---|---|
| 2008/0278567 A1* | 11/2008 | Nakajima | ............... | H04N 7/002 348/14.02 |
| 2009/0182917 A1* | 7/2009 | Kim | ...................... | G06F 3/1438 710/16 |
| 2012/0098960 A1* | 4/2012 | Fujino | ..................... | H05B 47/18 348/E5.119 |
| 2014/0211095 A1* | 7/2014 | Dickens | ................... | H04N 5/38 348/723 |
| 2018/0137833 A1* | 5/2018 | Hundal | .................. | G09G 5/006 |

OTHER PUBLICATIONS www.Unigraf.fi, Introduction to DisplayPort Link-Training Tunable Phy Repeaters (LTTPR), Feb. 10, 2020, p. 1-20 (Year: 2020).*

* cited by examiner

*Primary Examiner* — Henry Tsai
*Assistant Examiner* — Dean Phan
(74) *Attorney, Agent, or Firm* — Schwegman Lundberg & Woessner, P.A.

(57) ABSTRACT

Methods and systems are disclosed for an upstream facing port implementation for DisplayPort link-training tunable PHY repeaters (LTTPRs). The device includes an upstream facing port to interface with an external DisplayPort source device and a downstream facing port to interface with an external DisplayPort sink device and the upstream facing port. The upstream facing port is configured to perform operations including receiving a main link data stream from an external transmitting display device, generating an outbound main link data stream, and providing the outbound main link data stream for transmitting by the external device. The device is also configured for receiving an updated main link data stream corresponding to the outbound main link data stream and sending the updated main link data stream to the downstream facing port to be transmitted to a receiving display device.

20 Claims, 5 Drawing Sheets

PARTITIONED UFP FOR DISPLAYPORT REPEATER

TECHNICAL FIELD

The present disclosure generally relates to the technical field of DisplayPort link-training tunable PHY repeaters (LTTPR) in accordance with some embodiments.

BACKGROUND

Various communication protocols are implemented to communicate data between two or more devices. As data streams become increasingly dense with information, the communication protocols used to deliver the data streams from one device to another must keep up with such growing demands.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Various ones of the appended drawings merely illustrate example embodiments of the present inventive subject matter and cannot be considered as limiting its scope.

DETAILED DESCRIPTION

Figure 1:
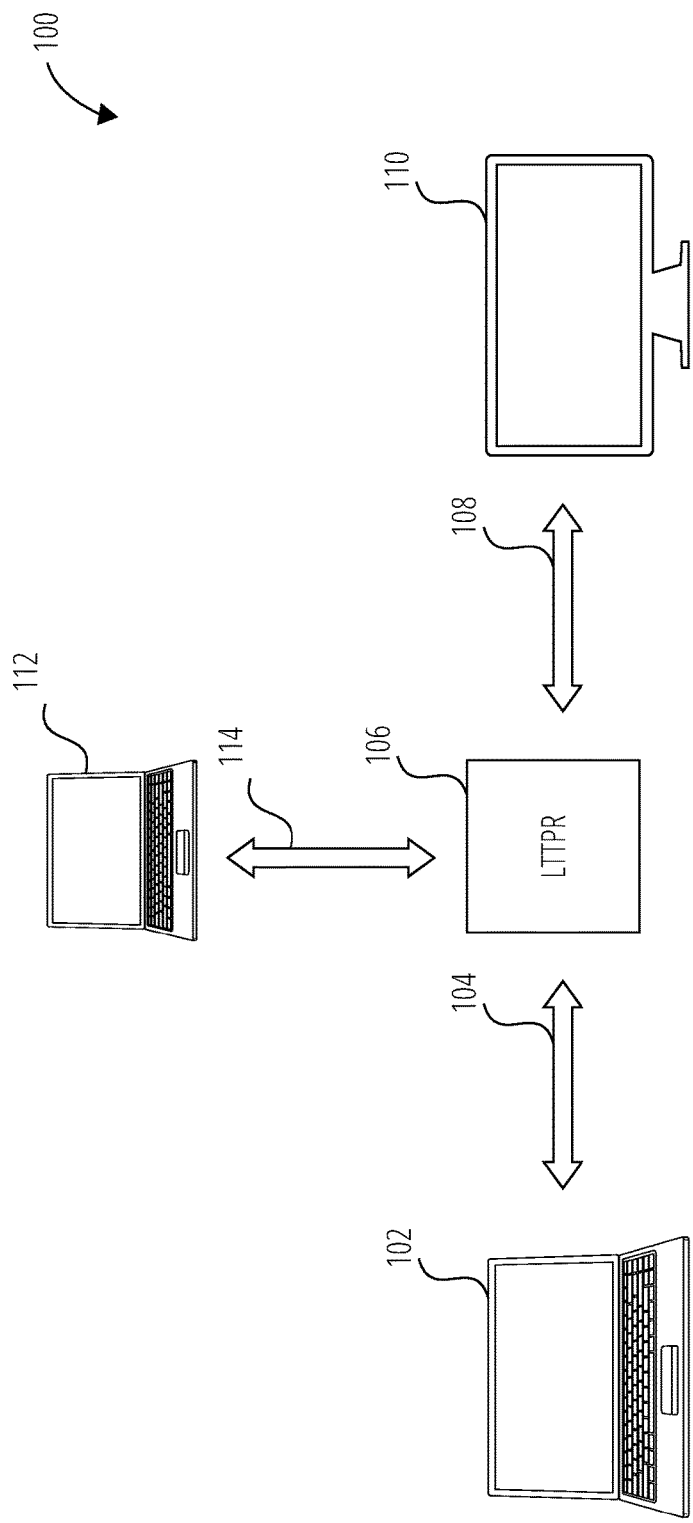
FIG. 1 is a block diagram illustrating a computer system in accordance with some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Multiple electronic devices can be configured and connected in various ways using various means. As electronic device capabilities increase, the information included in data streams may increase and require faster processing speeds.

A DisplayPort is a display interface used to communicate data streams in the form of packetized data between two or more electronic devices. A DisplayPort can be used to transmit both audio and video data streams simultaneous as well as transmitting the data streams individually.

Display or sink devices may be connected to source devices directly, or through mediums referred to as branch devices. Such branch devices include other electronic devices and wired and/or wireless communication means. Between any two sink and source devices, devices called repeaters may exist to facilitate data transmission.

The DisplayPort standard is a digital interface typically used to connect a video source to a display device. The DisplayPort can also transmit audio and other forms of data.

The DisplayPort transmits video and audio through the main link data stream. The main link data stream is transmitted between the source and sink device when the devices are connected via DisplayPort protocol. When connected, the DisplayPort negotiates the transmission mode for the main link data stream through a process called link training, typically including a link-training device such as a LTTPR. The link training process determines the maximum speed of the connection, quality of the connection, and other various parameters for transmission of the main link data stream. The auxiliary channel of the DisplayPort is used to transmit miscellaneous data beyond video and audio.

Within the DisplayPort communication standard, DisplayPort traffic is forwarded at the LTTPR between the upstream facing port and the downstream facing port. The DisplayPort traffic may include various data streams such as the main link, auxiliary, and hot plug detect (HPD). The LTTPR includes both an upstream and downstream facing port that are used to monitor, modify, schedule, and reschedule the data streams. The DisplayPort communication standard provides a general description to guide the forwarding logic between the upstream facing port and the downstream facing port.

With the increasing complexity of display interfaces interconnecting electronic devices, DisplayPort offers a convenient and streamlined solution to provide video and audio data over a singular cable. The DisplayPort utilizes packetized data transmission to transmit micro packets of data including an embedded clock signal. The embedded clock signal provides an efficient data transfer stream and allows the DisplayPort to support high resolutions and fast refresh rates. Conventional DisplayPorts may include one or more link-training LT-tunable PHY repeaters (LTTPRs) that contain the physical layer of upstream facing port and downstream facing port. The LTTPR implements all of the PHY layer—related functionalities defined by the DisplayPort including LT-tunable PHY repeater recognition, capability discover, link configuration, and link training. The DisplayPort is configured to forward all DisplayPort traffic (e.g., main link, aux, HPD).

LTTPRs typically contain a DisplayPort receiver (DPRX) referred to herein as the upstream facing port, and a DisplayPort transmitter (DPTX) referred to herein as the downstream facing port. The upstream facing port of the DisplayPort forwards the DisplayPort traffic to the downstream facing port within the LTTPR and the LTTPR applies certain monitoring, modification, and rescheduling operations for some DisplayPort traffic according to resource availability, timing, and other factors. However, the conventional DisplayPort LTTPRs do not define a way for third parties to interface with the traffic within the LTTPR between the upstream facing port and the downward facing port. This technical problem gives rise to a technical solution contemplated herein. Additionally, mechanisms are desired that allow the LTTPR to relay messages between the upstream and downstream facing ports.

Contrary to traditional approaches, the methods and systems disclosed herein provide a novel interface between the upstream facing port and the downstream facing port of the LTTPR to provide functionalities including data forwarding, status inquiry, and third-party interfacing.

As described herein, methods and systems provide a technical solution to the technical problem of a LTTPR with added capabilities that allow for third-party interfacing, data forwarding, and message relaying.

The various operations of example methods described herein may be performed, at least partially, by one or more processors that are temporarily configured (e.g., by software) or permanently configured to perform the relevant operations. Similarly, the methods described herein may be at least partially implemented by one or more processors. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things" while yet another combination produces a server computer for use within a cloud computing architecture. Not all combinations of such software and hardware architectures are presented here as those of skill in the art can readily understand how to implement the inventive subject matter in different contexts from the disclosure contained herein.

FIG. 1 illustrates an example computer system 100 where a computing device 102 is in communication with an external device 112 and a display device 110 over a communication channel 104 and 108. in accordance with some embodiments. The communication channel 104 may in some embodiments include a link training (LT)-tunable PHY repeater (LTTPR) 106. The communication channel 104 allows communication to flow between the computing device 102, the display device 110, and optionally with an external device 112.

The computing device 102 and the display device 110 may comprise different types of computing devices. The computing devices include, but are not limited to, a mobile phone, desktop computer, laptop, a portable digital assistant (PDA), smart phone, table, ultra book, netbook, multi-processor system, microprocessor based- or programmable consumer electronic, or any other communication device that a user may utilize to perform various computing tasks (e.g., accessing the Internet, consuming audio/visual content, etc.). In some embodiments, the display device 110 is a second computing device with a display or display module to display information (e.g., in the form of user interfaces). In further examples, the display device 110 may include one or more touch screens, accelerometers, gyroscopes, cameras, microphones, global positioning system (GPS) devices, and other similar and suitable sensors and modules. Additionally, the external device 112 may also be a distinct computing device similar to computing device 102 and/or display device 110.

The communication channel 104, the LTTPR 106, and the communication channel 108 may be part of a single communication cable (e.g., DisplayPort cable). The communication channel 114 may include protocols such as USB3 and placed between the computing device 102 and the display device 110. The communication channel 114 may further communicate with the external device 112 that may be used to configure, control, receive, interpret, analyze, forward instructions to and from the LTTPR that acts as an intermediary between computing device 102 and display device 110.

Figure 2:
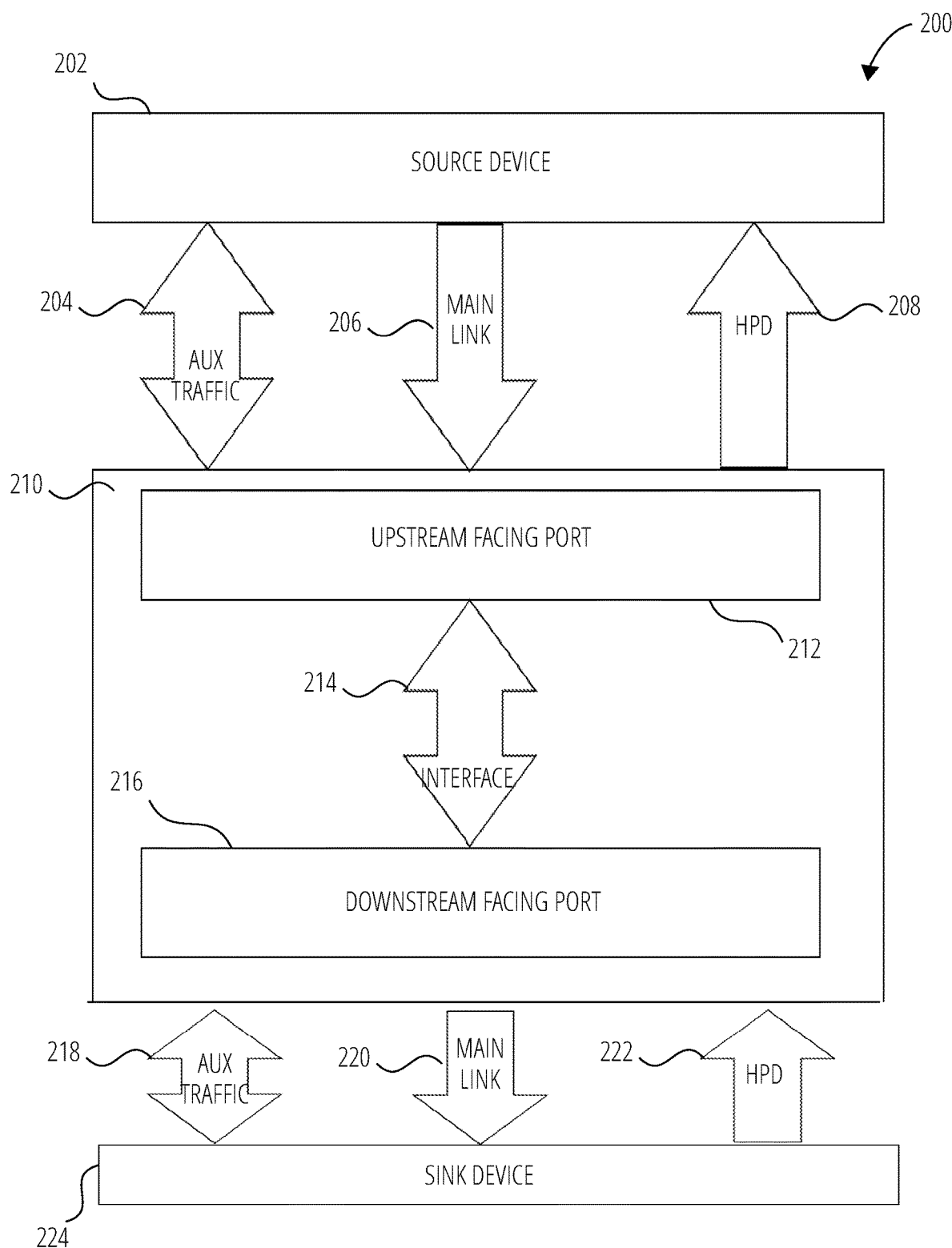
FIG. 2 is a diagram illustrating a LTTPR in accordance with some embodiments.

FIG. 2 is a diagram illustrating an example LTTPR environment 200 in accordance with some embodiments. Environment 200 of FIG. 2 illustrates the components of the LTTPR 106 illustrated in FIG. 1, according to an example embodiment. As shown in FIG. 2, a source device 202, a LTTPR 210 (similar to the LTTPR shown in FIG. 1), and a sink device 224 are configured. Between the source device 202 and sink device 224 is an LTTPR 210 separated into an upstream facing port 212 and downstream facing port 216.

The DisplayPort source device 202 may provide multiple data streams including an aux data stream 204, a main link data stream 206, and HPD data traffic stream 208. The upstream facing port 212 is configured to receive each of the data streams 204, 206, 208, and provide the data streams 204 and 206 to the downstream facing port 216. The data streams 204 and 206 are provided to the downstream facing port 216 through a verification IP interface 214 for both the main link and aux data streams (e.g., data streams 204 and 206). The verification IP interface 214 is a defined model register and callback-based mechanism for implementing upstream facing port status monitoring and handling of data streams. The verification IP interface 214 handles specific DisplayPort requirements including package tunnelling for protocols including USB4 and package monitoring, modifying, and/or discarding logic performed by third party IP that is outside of the DisplayPort's scope. The verification IP interface 214 may be used to provide an interface between the upstream facing port 212 and the downstream facing port 216 of the LTTPR 210 to support a third-party to access and update data streams (e.g., 204 and 206).

The LTTPR 210 is configured in a way such that the upstream facing port 212 and the downstream facing port 216 are distinct interfaces and configured to forward data streams from the upstream facing port 212 to the downstream facing port 216, allowing external or third-party devices to interface between the upstream and downstream facing ports 212, 216 of the LTTPR 210 as shown in FIG. 1.

The resulting bidirectional auxiliary stream 218, resulting main link data stream 220, and HPD traffic 222 is transmitted between the source device 202 and sink device 224 via downstream facing port 216. In some embodiments, a third-party device is not inserted between the upstream facing port 212 and downstream facing port 216 to update/adjust/test the data streams and the forwarded data streams are the same (unaffected) data streams as received by the upstream facing port 212.

Figure 3:
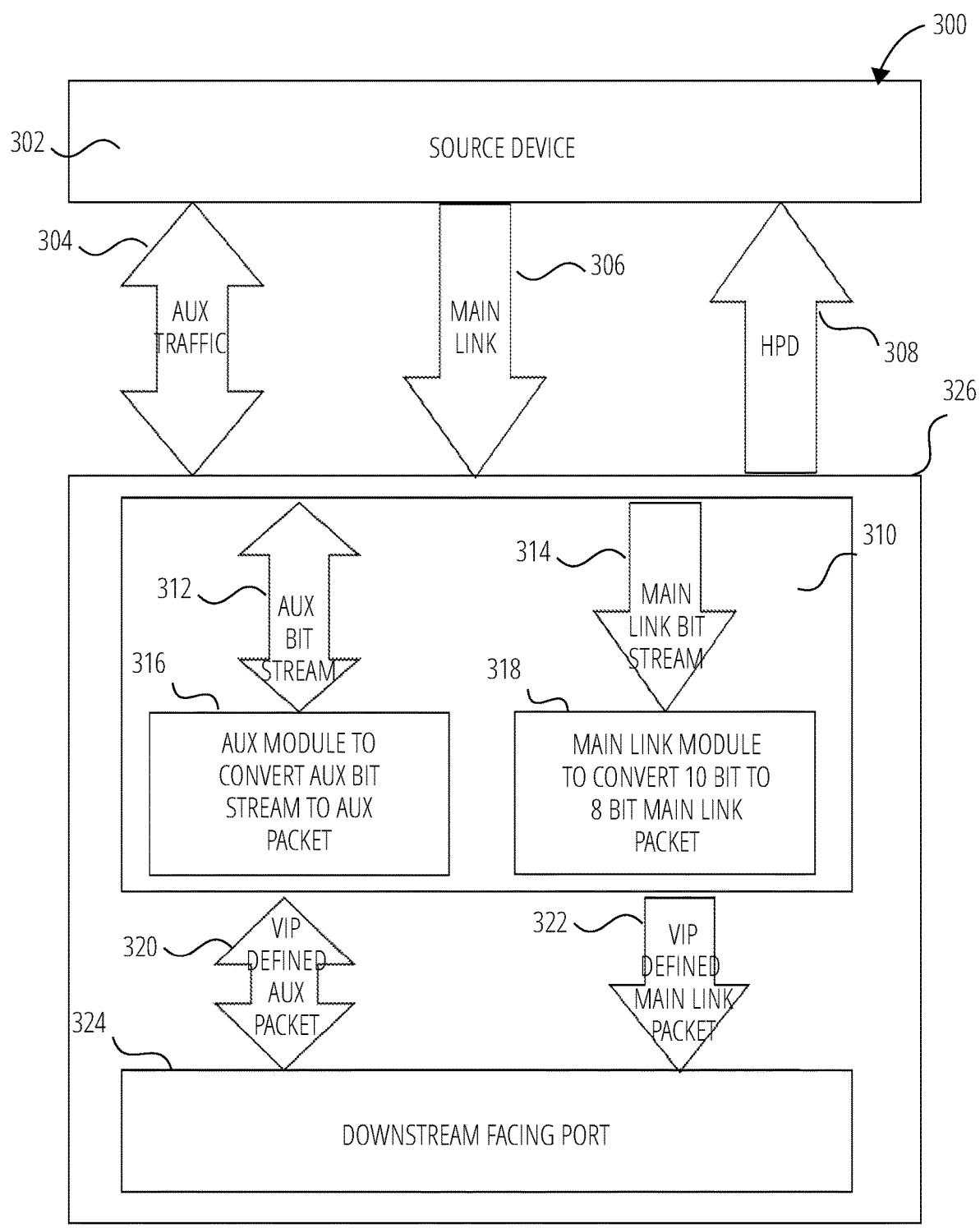
FIG. 3 is a diagram illustrating a standalone implementation of an LTTPR in accordance with some embodiments.

FIG. 3 is a diagram illustrating an implementation of an LTTPR in accordance with some embodiments. FIG. 3 illustrates an environment 300 including a source device 302 and LTTPR 326 that includes an upstream facing port 310 and a downstream facing port 324.

FIG. 3 illustrates the flow of the data streams as processed by the upstream facing port of the LTTPR illustrated in FIG. 1 and FIG. 2 according to some embodiments. Aux stream 304, main link data stream 306, and HPD traffic 308 are transmitted from source device 302 to the upstream facing port 310. It is understood that auxiliary traffic is bidirectional and the HPD signal travels from the sink device to the source device. Within the LTTPR 326, the aux stream 312 and main link stream 314 are processed. The aux module 316 converts the received aux bit stream 312 into an aux packet and provides the aux packet through the upstream facing port 310 through an auxLinkQueue callback operation 320. Similarly, the main link module 318 converts the received main link bit stream 314 into a main link packet and provides the main link packet through the upstream facing port 310 through MnLnkQ callback operation 322.

Figure 4:
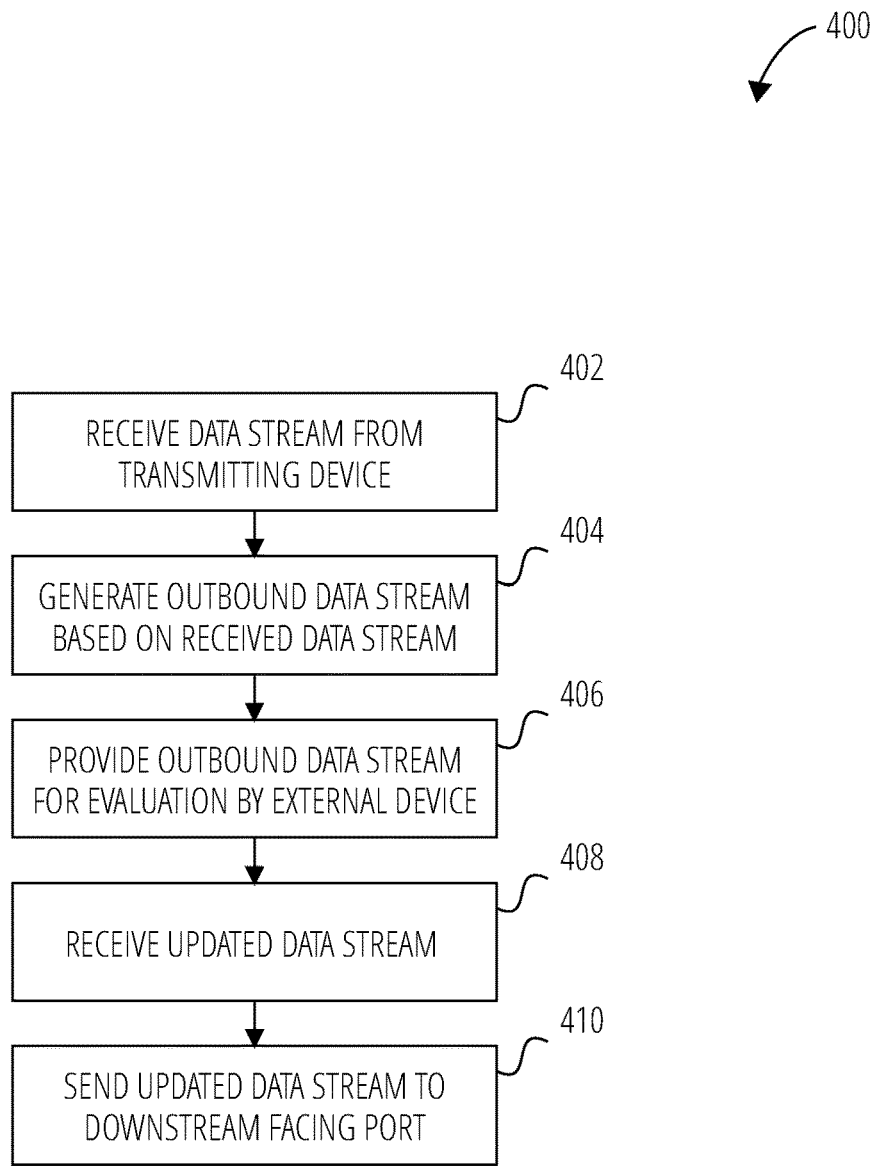
FIG. 4 is a flow diagram illustrating operations of the LTTPR in accordance with some embodiments.

FIG. 4 is a flowchart illustrating an example method 400 for implementing a DisplayPort LTTPR in accordance with some embodiments.

Method 400 begins at operation 402 where a device (e.g., DisplayPort LTTPR) receives a data stream from a transmitting device (e.g., computing device 102) at an upstream facing port of the device. In some embodiments, the data stream received from the transmitting device is a main link data stream. In some embodiments, the data stream received from the transmitting device is an auxiliary data stream. As the device (LTTPR) is configured to receive various types of data streams, the received data stream may vary. Additionally, the device (e.g., LTTPR) may concurrently receive multiple data streams.

The device may generate, at the upstream facing port, an outbound data stream (e.g., aux stream, main link data stream) based on the received data stream (operation 404). In some embodiments, generating the outbound data stream includes formatting the data stream into a specified format for the external device. For example, an outbound main link data stream is compressed and/or decoded from a 10-bit symbol to an 8-bit symbol for receipt by the external device.

The method 400 further includes providing, to an external device (e.g., external device 112), at operation 406, the outbound data stream for evaluation. For example, a main link data stream is to be bench tested by a third-party device. The third-party device connects to the main link data stream via LTTPR of the DisplayPort. The upstream facing port processes the main link data stream from a 10-bit symbol into an 8-bit symbol and exposes the main link data stream to the external device for bench testing.

At operation 408, the device receives an updated data stream from the external device, the updated data stream corresponding to the outbound data stream provided at operation 406. For example, an external device is used to test the data stream.

In some embodiments, the device sends, from the upstream facing port to the downstream facing port, a status inquiry before sending the updated data stream (e.g., updated main link data stream, updated auxiliary data stream) to the downstream facing port. The device receives a status of the downstream facing port by the upstream facing port.

In response to a determination that the status of the downstream facing port is active, the device sends the updated data stream to the downstream facing port (at operation 410) to be transmitted to a receiving display device 110 (e.g., monitor). In response to a determination that the status of the downstream facing port is inactive, busy, offline, or otherwise occupied, the updated data stream is maintained at the upstream facing port.

Although FIG. 4 illustrates one instance of forwarding data streams from a source device to a sink device via DisplayPort LTTPR, one of ordinary skill in the art will appreciate that one or more of operations 402-410 may be repeated as necessary.

Figure 5:
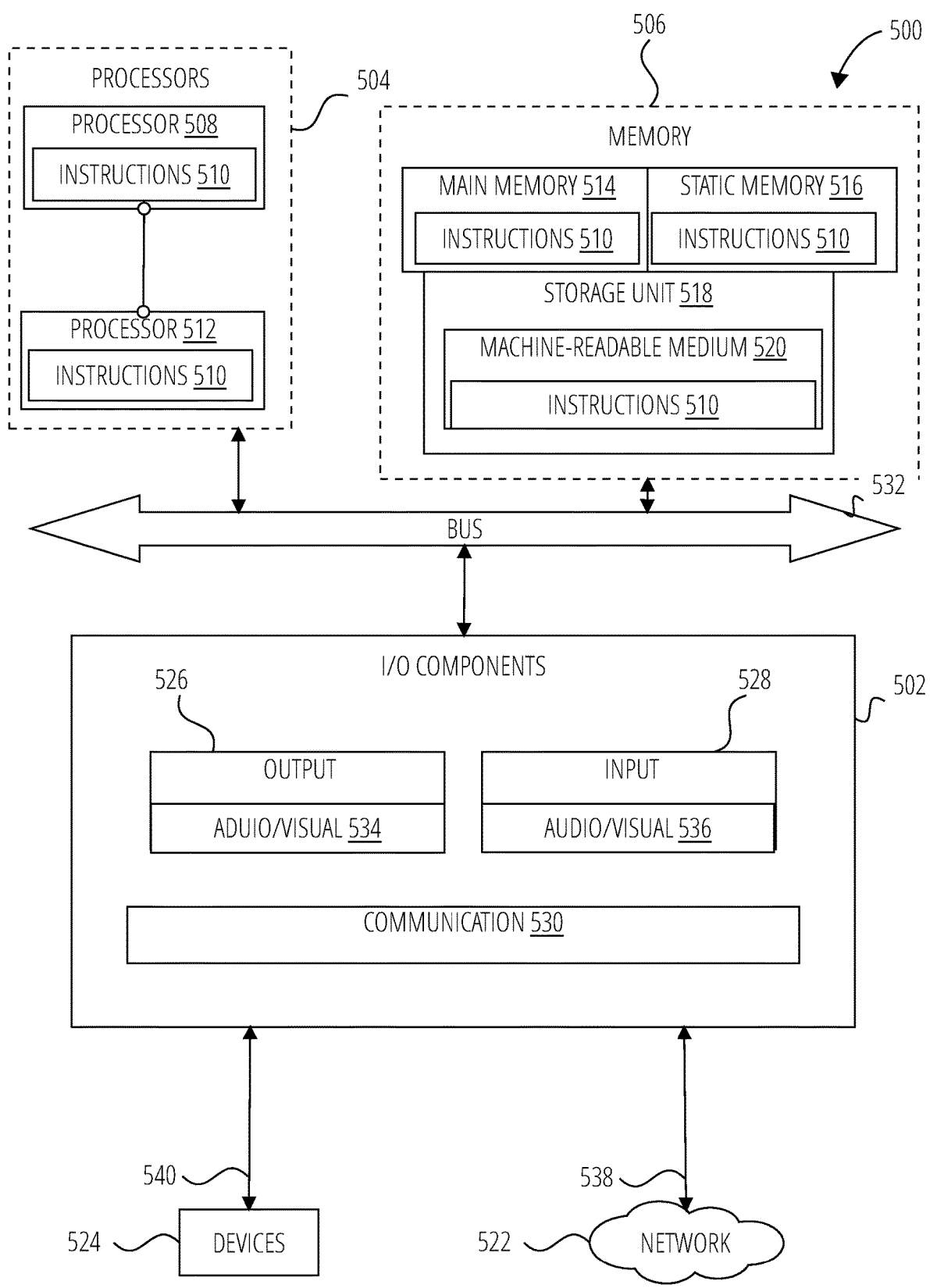
FIG. 5 is a diagrammatic representation of a machine in the example form of a computer system within which a set of instructions for causing the machine to perform any one or more of the methodologies discussed herein may be stored and executed.

FIG. 5 is a block diagram illustrating components of a machine 500, according to some embodiments, able to read instructions from a machine-readable medium (e.g., machine-readable storage medium or machine-readable storage device) and perform any one or more of the methodologies discussed herein. Specifically, computing device 102, display device 110, and/or external device 112 may each individually include one or more processors, memory, I/O components, and instructions which may be configured to communication with each other. The instructions 510 may cause the machine 500 to execute the method 400 illustrated in FIG. 4. Additionally, or alternatively, the instructions 510 may implement one or more of the components of FIG. 2-3. The instructions 510 transform the general, non-programmed machine 500 into a particular machine 500 programmed to carry out the described and illustrated functions in the manner described. In alternative embodiments, the machine 500 operates as a standalone device or may be coupled (e.g., connected) to other machines.

The machine 500 may comprise, but not be limited to, a server computer, a client computer, a personal computer (PC), a tablet computer, a laptop computer, a netbook, a PDA, or any machine capable of executing the instructions 510, sequentially or otherwise, that specify actions to be taken by machine 500. Further, while only a single machine 500 is illustrated, the term "machine" shall also be taken to include a collection of machines 500 that individually or jointly execute the instructions 510 to perform any one or more of the methodologies discussed herein.

The machine 500 may include processors 504, memory/storage 506, and I/O components 502, which may be configured to communicate with each other such as via a bus 532. In an example embodiment, the processors 508 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, processor 508 and processor 512 that may execute the instructions 510. The term "processor" is intended to include multi-core processor that may comprise two or more independent processors (sometimes referred to as "cores") that may execute instructions 510 contemporaneously. Although FIG. 5 shows multiple processors 504, the machine 500 may include a single processor with a single core, a single processor with multiple cores (e.g., a multi-core process), multiple processors with a single core, multiple processors with multiples cores, or any combination thereof.

The memory/storage 506 may include a memory 514, such as a main memory or other memory storage, a static memory 516, and a storage unit 518, all accessible to the processors 504 such as via the bus 532. The storage unit 518, static memory 516, and memory 514 store the instructions 510 embodying any one or more of the methodologies or functions described herein. The instructions 510 may also reside, completely or partially, within the memory 514, within the static memory 516, within the storage unit 518, within at least one of the processors 504 (e.g., within the processor's cache memory), or any suitable combination thereof, during execution thereof by the machine 500. Accordingly, the memory 514, the static memory 516, the storage unit 518, and the memory of processors 504 are examples of machine-readable media.

As used herein, "machine-readable medium" includes a machine-readable storage device able to store instructions 510 and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 510. The term "machine-readable medium" shall also be taken to include any medium, or combination of multiple media, that is capable of storing instructions (e.g., instructions 510) for execution by a machine (e.g., machine 500), such that the instructions, when executed by one or more processors of the machine 500 (e.g., processors 504), cause the machine 500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 502 may include a wide variety of components to receive input, provide output, produce output, transmit information, exchange information, capture measurements, and so on. The specific I/O components 502 that are included in a particular machine will depend on the type of machine. For example, portable machines such as mobile phones will likely include a touch input device or other such input mechanisms, while a headless server machine will likely not include such a touch input device. It will be appreciated that the I/O components 502 may include many other components that are not shown in FIG. 5. The I/O components 502 are grouped according to functionality merely for simplifying the following discussion and the grouping is in no way limiting. In various example embodiments, the I/O components 502 may include output components 526 and input components 528. The output components 526 may include audio/visual components 534 (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 528 may include audio/visual component 536, alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 502 may include communication components 530 operable to couple the machine 500 to a network 522 or devices 524 via coupling 538 and coupling 540, respectively. For example, the communication components 530 may include a network interface component or other suitable device to interface with the network 522. In further examples, communication components 530 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 524 may be another machine or any of a wide variety of peripheral devices (e.g., a peripheral device coupled via a USB).\

Moreover, the communication components 530 may detect identifiers or include components operable to detect identifiers. For example, the communication components 530 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF416, Ultra Code, UCC RSS-2D bar code, and other optical codes), or acoustic detection components (e.g., microphones to identify tagged audio signals). In addition, a variety of information may be derived via the communication components 530, such as location via Internet Protocol (IP) geo-location, location via Wi-Fi® signal triangulation, location via detecting an NFC beacon signal that may indicate a particular location, and so forth.

The instructions 510 may be transmitted or received over the network 522 using a transmission medium via a network interface device (e.g., a network interface component included in the communication components 530) and utilizing any one of a number of well-known transfer protocols (e.g., hypertext transfer protocol (HTTP)). Similarly, the instructions 510 may be transmitted or received using a transmission medium via the coupling 540 (e.g., a peer-to-peer coupling) to devices 524. The term "transmission medium" shall be taken to include any intangible medium that is capable of storing, encoding, or carrying instructions 510 for execution by the machine 500, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated unless indicated otherwise. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A machine-readable medium comprising instructions that, when executed by one or more processors of a link-training tunable physical layer repeater (LTTPR) device, cause the LTTPR device to performing operations comprising:
   receiving, at an upstream facing port of the LTTPR device, a main link data stream and an auxiliary data stream from a source device, the main link and auxiliary data streams being distinct data streams;
   generating, at the upstream facing port, an outbound main link data stream based on the received main link data stream, the generating of the outbound main link data stream comprising formatting the received main link data stream into a specified format for an external electronic device, the outbound main link data stream having a first-bit symbol format, the received main link data stream having a second-bit symbol format that is smaller than the first-bit symbol format;
   generating, at the upstream facing port, an outbound auxiliary data stream based on the received auxiliary data stream;
   providing from a verification interface of the LTTPR device, to the external electronic device, the outbound main link data stream and the outbound auxiliary data stream for evaluation, the verification interface providing an interface between the upstream facing port and a downstream facing port of the LTTPR device;
   receiving at the verification interface, from the external electronic device, an updated main link data stream and an updated auxiliary data stream; and
   sending, from the verification interface, the updated main link data stream and the updated auxiliary data stream to the downstream facing port to be transmitted to a receiving display device.

2. The machine-readable medium of claim 1, wherein the updated main link data stream is sent to the receiving display device concurrently with the updated auxiliary data stream.

3. The machine-readable medium of claim 1, the operations further comprising:
   sending, from the upstream facing port to the downstream facing port, a status inquiry before sending the updated main link data stream to the downstream facing port;
   receiving a status of the downstream facing port from the upstream facing port; and
   in response to a determination that the status of the downstream facing port is active, sending the updated main link data stream to the downstream facing port.

4. The machine-readable medium of claim 3, wherein in response to the determination the status of the downstream facing port is inactive, maintaining the updated main link data stream at the upstream facing port.

5. The machine-readable medium of claim 1, wherein the first-bit symbol format is a 10-bit symbol format, and the second-bit symbol format is a 8-bit symbol format.

6. The machine-readable medium of claim 1, wherein generating the outbound main link data stream comprises decoding the received main link data stream from a 10-bit symbol to an 8-bit symbol packet.

7. A device, comprising:
   an upstream facing port to interface with an external DisplayPort source device;
   a downstream facing port to interface with an external DisplayPort sink device; and
   a verification interface to interface between the upstream facing port and the downstream facing port;
   wherein the upstream facing port is configured to perform operations comprising:
      receiving a main link data stream from the external DisplayPort source device; and
      generating an outbound main link data stream by formatting the received main link data stream into a specified format for an external electronic device, the outbound main link data stream having a first-bit symbol format, the received main link data stream having a second-bit symbol format that is smaller than the first-bit symbol format;
   wherein the verification interface is configured to perform operations comprising:
      providing the outbound main link data stream to the external electronic device;
      receiving, from the external electronic device, an updated main link data stream corresponding to the outbound main link data stream; and
      sending the updated main link data stream to the downstream facing port to be transmitted to the external DisplayPort sink device.

8. The device of claim 7, comprising:
   receiving, at the upstream facing port, an auxiliary data stream, wherein the auxiliary data stream is distinct from the received main link data stream;
   generating an outbound auxiliary data stream based on the received auxiliary data stream;
   providing, to the external electronic device, the outbound auxiliary data stream to be evaluated by the external electronic device;
   receiving, from the external electronic device, an updated auxiliary data stream that corresponds to the outbound auxiliary data stream; and
   sending the updated auxiliary data stream to the downstream facing port of the device to be forwarded to the external DisplayPort sink device.

9. The device of claim 8, wherein the updated main link data stream is sent to the external DisplayPort sink device concurrently with the updated auxiliary data stream.

10. The device of claim 8, comprising:
   sending, from the upstream facing port to the downstream facing port, a status inquiry before sending the updated main link data stream to the downstream facing port;

receiving a status of the downstream facing port from the upstream facing port; and in response to a determination that the status of the downstream facing port is active, sending the updated main link data stream to the downstream facing port.

11. The device of claim 10, wherein in response to the determination that the status of the downstream facing port is inactive, maintaining the updated main link data stream at the upstream facing port.

12. The device of claim 8, wherein the first-bit symbol format is a 10-bit symbol format, and the second-bit symbol format is a 8-bit symbol format.

13. The device of claim 8, wherein generating the outbound main link data stream comprises decoding the received main link data stream from a 10-bit symbol to an 8-bit symbol packet.

14. A method comprising:

receiving, at an upstream facing port of a link-training tunable physical layer repeater (LTTPR) device, a main link data stream from a source device;

generating, at the upstream facing port, an outbound main link data stream based on the received main link data stream, the generating of the outbound main link data stream comprising formatting the received main link data stream into a specified format for an external electronic device, the outbound main link data stream having a first-bit symbol format, the received main link data stream having a second-bit symbol format that is smaller than the first-bit symbol format;

providing from a verification interface of the LTTPR device, to an external electronic device, the outbound main link data stream for evaluation by the external electronic device, the verification interface providing an interface between the upstream facing port and a downstream facing port of the LTTPR device;

receiving at the verification interface, from the external electronic device, an updated main link data stream that corresponds to the outbound main link data stream; and sending, from the verification interface, the updated main link data stream to the downstream facing port to be transmitted to a receiving display device.

15. The method of claim 14, comprising:

receiving, at the upstream facing port, an auxiliary data stream, wherein the auxiliary data stream is distinct from the received main link data stream;

generating an outbound auxiliary data stream based on the received auxiliary data stream;

providing, to the external electronic device, the outbound auxiliary data stream to be evaluated by the external electronic device;

receiving, from the external electronic device, an updated auxiliary data stream that corresponds to the outbound auxiliary data stream; and sending the updated auxiliary data stream to the downstream facing port of the LTTPR device to be forwarded to the receiving display device.

16. The method of claim 15, wherein the updated main link data stream is sent to the receiving display device concurrently with the updated auxiliary data stream.

17. The method of claim 14, the method further comprising:

sending, from the upstream facing port to the downstream facing port, a status inquiry before sending the updated main link data stream to the downstream facing port;

receiving a status of the downstream facing port at the upstream facing port; and in response to a determination that the status of the downstream facing port is active, sending the updated main link data stream to the downstream facing port.

18. The method of claim 17, wherein in response to the determination that the status of the downstream facing port is inactive, maintaining the updated main link data stream at the upstream facing port.

19. The method of claim 14, wherein the first-bit symbol format is a 10-bit symbol format, and the second-bit symbol format is a 8-bit symbol format.

20. The method of claim 14, wherein generating the outbound main link data stream comprises decoding the received main link data stream from a 10-bit symbol to an 8-bit symbol packet.

* * * * *